United States Patent [19]

Hare

[11] 3,948,372

[45] Apr. 6, 1976

[54] CENTRIFUGAL CLUTCH

[76] Inventor: Terence G. Hare, 22600 Middlebelt G-11, Farmington, Mich. 48024

[22] Filed: Apr. 29, 1974

[21] Appl. No.: 465,251

[52] U.S. Cl............ 192/105 BA; 192/45; 192/103 B
[51] Int. Cl.² .......................................... F16D 23/10
[58] Field of Search ........ 192/45, 103 B, 41 R, 105 A, 192/105 BA, 105 CE, 77

[56] References Cited
UNITED STATES PATENTS

| | | | |
|---|---|---|---|
| 1,947,420 | 2/1934 | Mikulasek ........................ | 192/103 B |
| 2,312,889 | 3/1943 | Everts .............................. | 192/103 B |
| 2,382,331 | 8/1945 | Peterson et al. ................. | 192/45 |
| 2,758,690 | 8/1956 | Hare ................................ | 192/105 BA |
| 2,765,063 | 10/1956 | Hare ................................ | 192/105 BA |
| 3,306,410 | 2/1967 | Hare ................................ | 192/105 BA |

FOREIGN PATENTS OR APPLICATIONS

| | | | |
|---|---|---|---|
| 1,054,363 | 10/1953 | France ........................... | 192/105 BA |

*Primary Examiner*—Samuel Scott
*Assistant Examiner*—Randall Heald
*Attorney, Agent, or Firm*—Barnes, Kisselle, Raisch & Choate

[57] ABSTRACT

A clutch construction comprising inner and outer relatively rotatable members, and a flexible friction band interposed between said members. A plurality of separate elements are interposed circumferentially between the band and the inner member in abutting engagement with one another and otherwise being independent of each other. Force applying means is provided and is operable in response to rotation of one of said members to act on said elements and urge them radially outwardly and circumferentially to maintain said elements in abutting engagement not withstanding said radially outward movement thereof. After engagement, and upon overrunning by the other member or upon reduction in the speed of rotation of the one member, disengaging means on the one member acts on the band to disengage the drive.

8 Claims, 10 Drawing Figures

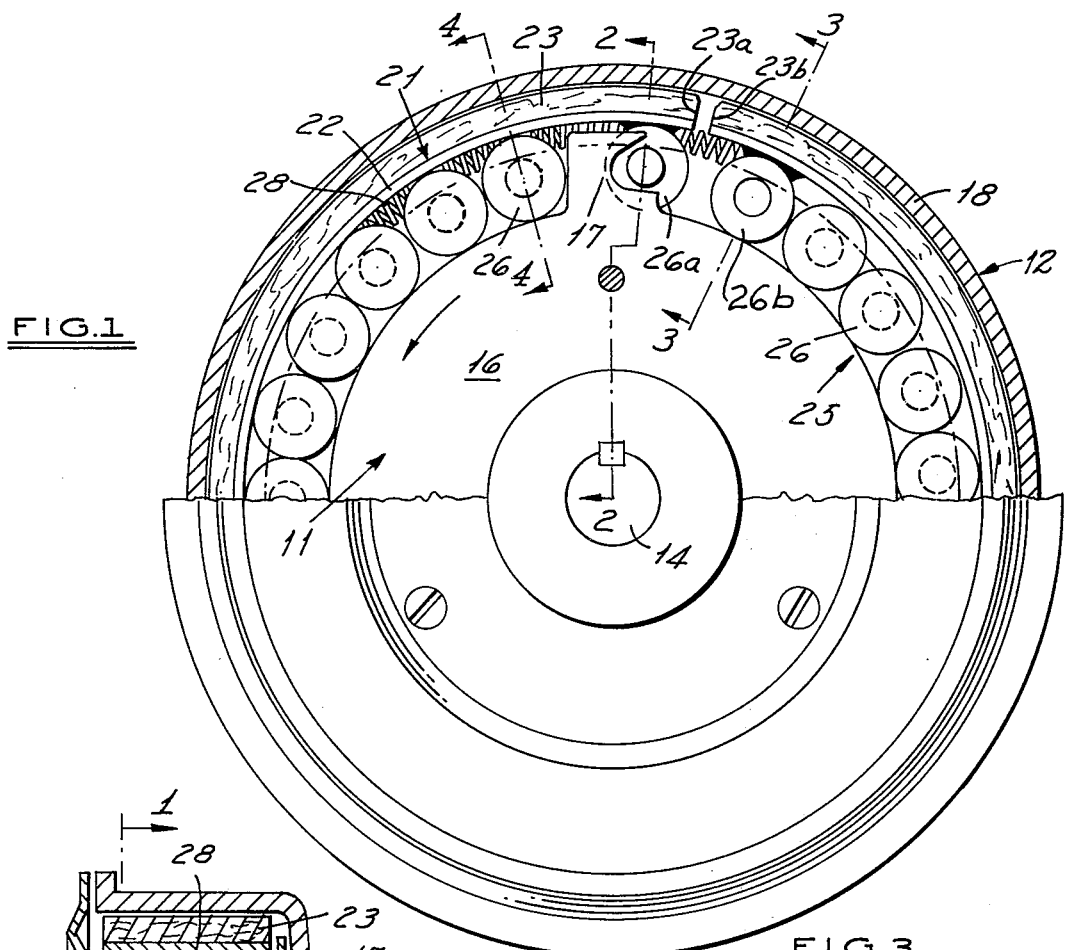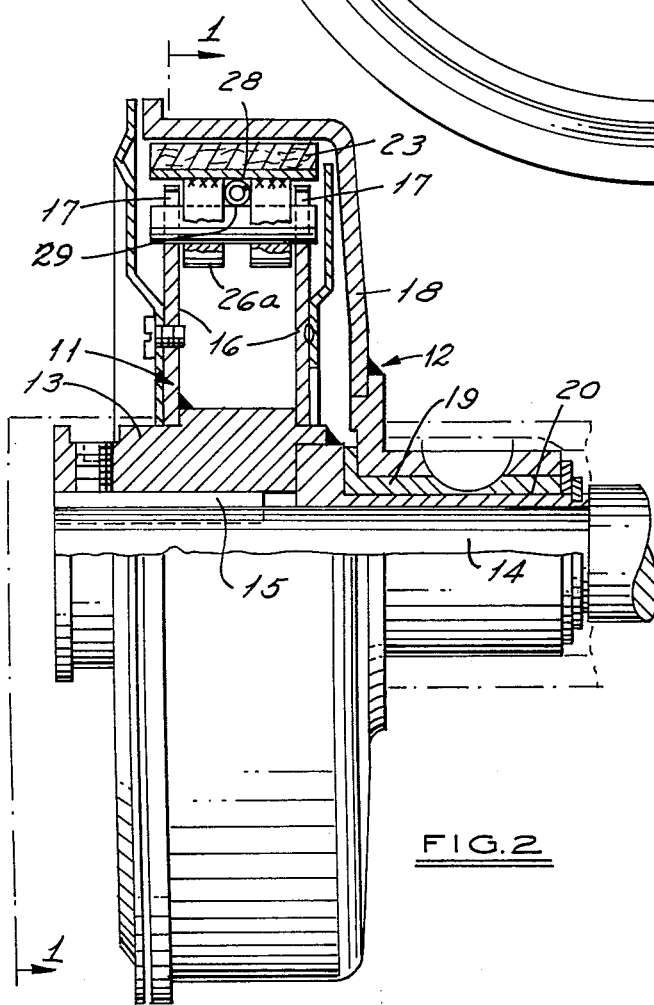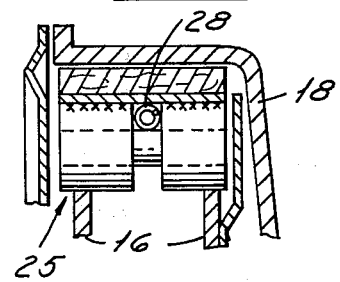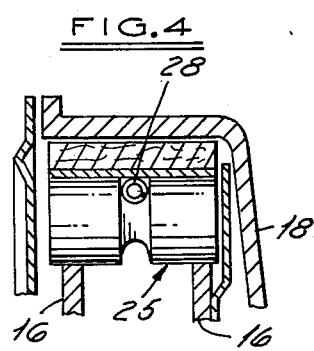

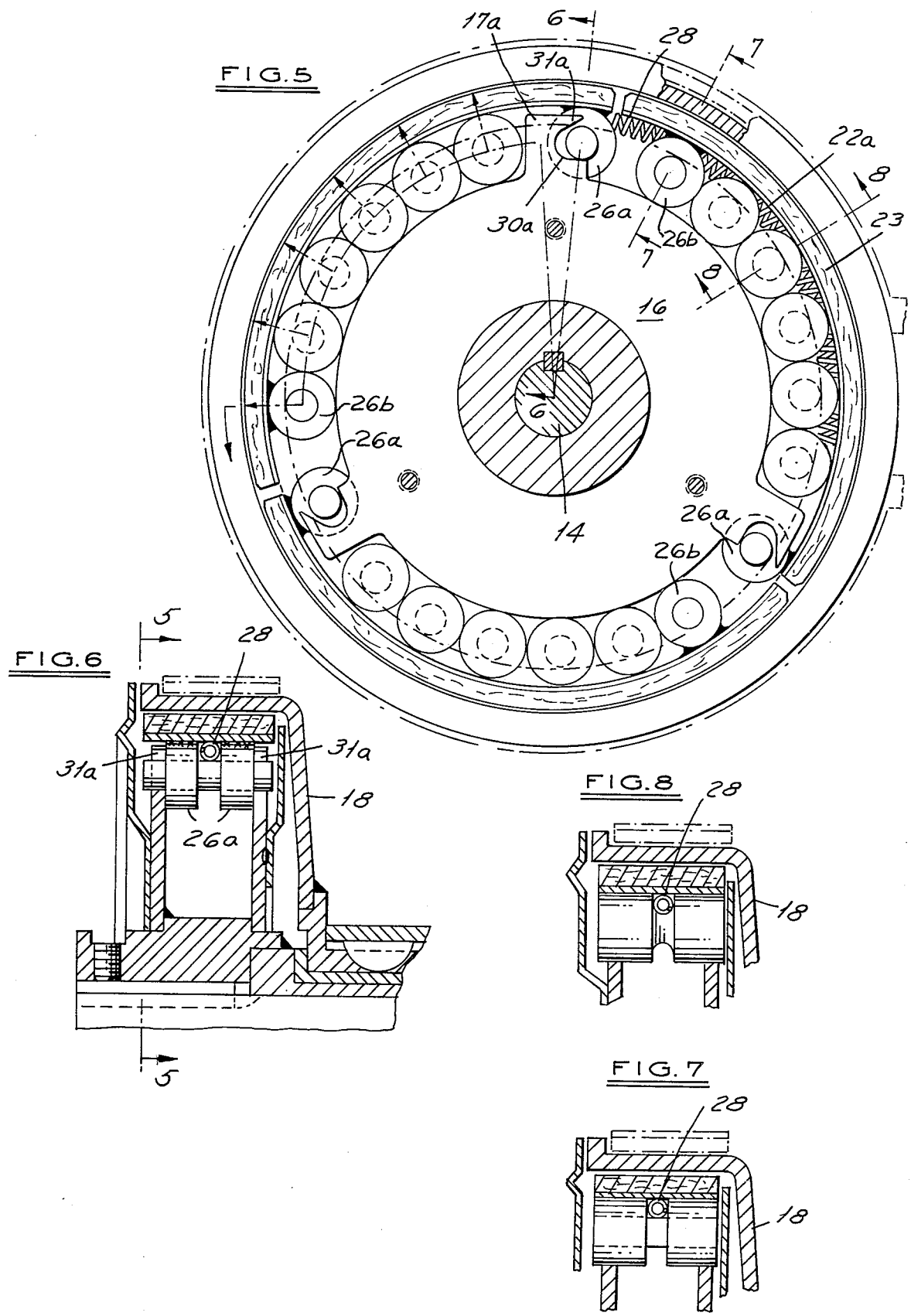

3,948,372

CENTRIFUGAL CLUTCH

This invention relates to centrifugal clutches.

BACKGROUND OF THE INVENTION

In my prior U.S. Pat. No. 3,306,410 there is disclosed and claimed a clutch construction comprising inner and outer relatively rotatable members, and a flexible friction band interposed between said members. A plurality of separate elements are interposed circumferentially between said band and said inner member in abutting engagement with one another and otherwise being independent of each other. Force applying means operable in response to rotation of one of said members to act on said elements and urge them radially outwardly and circumferentially to maintain said elements in abutting engagement not withstanding said radially outward movement thereof.

Such a construction effectively functions to provide a positive drive.

Among the objects of the invention is to provide a simple and effective means for disengaging the clutch upon overrunning or interruption of the drive.

SUMMARY OF THE INVENTION

In accordance with the invention, means are provided on one of the members for engaging the band upon overrunning or deceleration to disengage the clutch.

DESCRIPTION OF THE DRAWINGS

FIG. 1 is a part sectional side elevational view of a clutch embodying the invention, parts being broken away.

FIG. 2 is a sectional view taken along the line 2—2 in FIG. 1.

FIG. 3 is a fragmentary sectional view taken along the line 3—3 in FIG. 1.

FIG. 4 is a fragmentary sectional view taken along the line 4—4 in FIG. 1.

FIG. 5 is a sectional side elevational view of a modified form of the invention.

FIG. 6 is a sectional view taken along the line 6—6 in FIG. 5.

FIG. 7 is a fragmentary sectional view taken along the line 7—7 in FIG. 5.

FIG. 8 is a fragmentary sectional view taken along the line 8—8 in FIG. 5.

Figure 9:
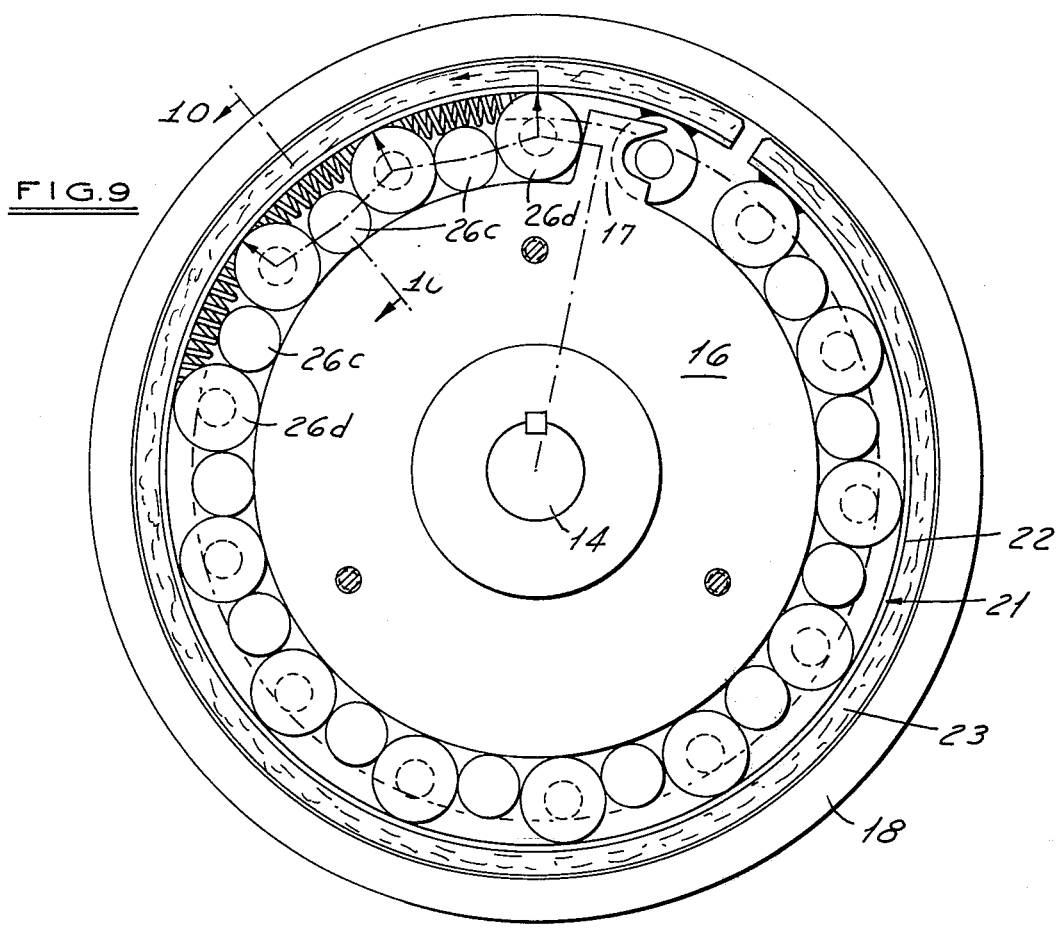
FIG. 9 is a part sectional side elevational view of a further modified form of the invention.

A clutch constructed in accordance with the embodiment disclosed in FIGS. 1, 2 and 3 comprises concentric, coaxial, relatively rotatable inner and outer parts 11 and 12, respectively, which are adapted to be rotated in unison in response to rotation at a predetermined speed of the inner unit 11. The inner unit comprises a hub 13 that may be fixed to a shaft 14 by means of a key 15 or the like, the shaft 14 being rotated by a prime mover of any suitable kind (not shown). Fixed to the hub 13 in any suitable manner is one or more, and preferably a pair of spaced apart, substantially annular plates 16, each of which has a radially extending, force applying or driving projection 17 thereon. The projections 17 are axially aligned with one another. The arrangement is such that rotation of the shaft 14 will effect rotation of the inner clutch part 11 relative to the outer clutch part 12.

The outer clutch part 12 comprises a substantially cup-shaped drum 18 that is suitably secured to a sleeve member 19 which may be rotatably journaled on the shaft 14 by means of a bearing 20. The drum 18 or the sleeve member 19, or both, may be fixed to a part to be rotated.

Interposed between the clutch parts 11 and 12 is a flexible clutch band 21 comprising a preferably resilient, metal strap 22 to the radially outer surface of which is bonded or otherwise suitably fixed a friction lining 23 formed of a conventional brake lining material, for example. The length of the strap 22 is such that the opposite ends 23a and 23b of the latter are spaced from one another when the parts are assembled.

Preferably, the strap 22 is formed to a diameter smaller than the diameter of the drum 28, thereby having a normal tendency to prevent engagement between the drum and the lining 23. In this arrangement there would be no need to provide additional spring means tending to reduce the diameter of the band. Preferably, an endless garter spring 28 extends around elements 26 in grooves 29 therein.

The apparatus includes a plurality of separate or independent force transmitting elements 25 circumferentially interposed between the inner clutch part 16 and the band 21. Each element 25 comprises a generally cylindrical roller 26. At each end of the band 21 the terminal roller 26a, 26b is fixed to the strap 22 by welding or the like so as to constitute a stop. Each terminal roller 26a, 26b, comprises two separate parts and a pin 27 extends therethrough. Rollers 26a comprise stop members and rollers 26b comprise actuating members, as presently described. The other rollers 26 are in abutting engagement with one another, but otherwise are independent of each other. The rollers 26 extend circumferentially around the member 16 from the member 26b toward the opposite end of the band 21. The number of rollers is such as to occupy completely the space between the stop roller 26a and the driving projections 17, but provide for sufficient clearance between the projections 17 and the stop 26a as to permit radial contraction of the band 21 under influence of the spring 24 an amount sufficient to permit relative rotation between the members 11 and 12.

In the operation of the apparatus described thus far, rotation of the shaft 14 counterclockwise, as viewed in FIG. 1, will cause the driving projections 17 on the inner members 16 to rotate in the counterclockwise direction. The projections 17 will bear against the endmost adjacent roller 26 and, through each of the other free elements 26, exert a force on the stop element 26b tending to rotate the band 21 in a counterclockwise direction. That is, the projections 17 and the elements 26 tend to drive the band 21 in the direction of rotation of the inner clutch member by exerting a pushing force adjacent the leading end 23b of the band. Applying a pushing force to the leading end of a split band through rollers 26, 26b will cause the trailing end 23a of the lining to be forced into engagement with the inner surface of the drum 18, especially if the band has a natural tendency to expand radially, thereby providing resistance to the counterclockwise rotation of the band.

As the speed of rotation of the inner member 11 increases, the free roller elements 26 will be urged radially outwardly by centrifugal force, thereby urging the band 21 radially outwardly toward the inner surface of the drum 18. The driving projections 17 also will exert a force on each of the free elements 26 urging them tightly against the stop element 26b. Since the friction lining 23 will be in engagement with the drum 18, the stop 26b resists the force imposed thereon by the driving projections 17 and exerts a counter force on the elements 26. Inasmuch as the confronting surfaces of any two elements 26 are convexly arcuate, the engagement of one element 26 with its adjacent element will be at a point which is tangential to the surfaces of the two elements. The force exerted by the rollers on opposite sides of the roller 26, therefore, tends to squeeze or wedge the roller 26 outwardly toward the band 21. The same result obtains for each of the other independent or free rollers. The force exerted by the driving members 17 and counteracted by the stop 26b, therefore, produces a force on the elements 26 which has the net effect of urging the elements 26 radially outwardly so as to force the friction lining 23 into engagement with the drum 18 more tightly than could be accomplished by centrifugal force alone. Thus, the clutch construction is self-energizing and effects a positive coupling between the inner and outer members 11 and 12 in response to rotation of the member 11 relative to the member 12.

In accordance with the invention, the projection 17 has a recess 30 that faces rearwardly with respect to the direction of rotation. Recess 30 includes a surface 31 that is inclined outwardly to provide a ramp. When the driven member 12 overruns the drive member 11 or the speed of drive member is reduced, the surface 31 engages the pin of roller 26a to lift the trailing end of the band 21 radially inwardly away from the outer clutch part 12 and thereby disengage the clutch.

The embodiment of the invention shown in FIGS. 4–8 is similar to the previously described embodiment and similar parts are designated by similar reference characters. In the modified embodiment, the band 21a is formed of three parts, each of which includes an arcuate shoe 22a on which is bonded or otherwise suitably fixed friction lining material 23a. Adjacent each end of each strap is fixed a stop element 26a, 26b and between the stops 26a, 26b of each strap is a plurality of independent, free roller elements 26. Each of the roller elements 26, including the stop element 26a, 26b is provided with a centrally located, peripheral groove 29 which accommodates an endless garter spring 28 that extends completely around the assembled elements 26. Each of the disks 16 of the inner clutch part includes three diametrically opposed force applying or driving projections 17a which function in exactly the same manner as the projections 17 previously described. As is indicated in FIG. 4, the projections 17a are received between the stop element 26a and the next adjacent element 26 in the direction of rotation of the inner clutch part. Recess 30a and surface 31a are provided on each projection 17a.

The operation of the apparatus shown in FIGS. 4 and 5 is similar to the operation previously described in that rotation of the shaft 14 counterclockwise, as is viewed in FIG. 5, will cause corresponding rotation of the inner clutch part, including the disks 16, thereby causing the elements 26 in advance of the projections 17a to be urged radially outwardly and toward the associated stop elements 26b. The counter force exerted on the elements 26 by the stop elements 26b will cause the elements 26 to be wedged radially outwardly, in the same manner previously described, so as to couple the inner and outer clutch parts together. The manner in which the forces are transmitted is shown by the arrows in FIG. 5. Upon deceleration or overrunning, surface 30a will disengage the clutch.

Figure 10:
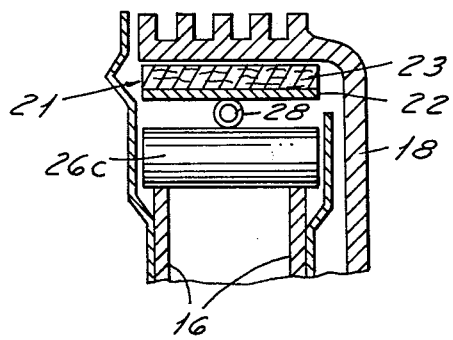
FIG. 10 is a fragmentary sectional view taken along the line 10—10 in FIG. 9.

In the form of the invention shown in FIGS. 9 and 10, the force transmitting elements 25 comprise various size rollers and preferably comprise alternate small and large diameter rollers 26c and 26d. When the clutch is engaged the small rollers 26c function to force the large rollers 26d outwardly to increase the force of engagement as shown by the force arrows in FIG. 9.

I claim:

1. In a clutch construction comprising inner and outer relatively rotatable members, a flexible friction band interposed between said members, a plurality of separate elements interposed circumferentially between said band and said inner member in abutting engagement with one another and otherwise being independent of each other, and force applying means operable in response to rotation of one of said members to act on said elements and urge them radially outwardly and circumferentially to maintain said elements in abutting engagement not withstanding said radially outward movement thereof, the improvement comprising means on said one member operable upon overrunning or deceleration to disengage said clutch, said force applying means comprising a projection on said one member and stop means on the trailing edge of said band, said disengaging means and said stop means having interengaging surfaces which engage upon deceleration or overrunning and move the band out of engagement.

2. The combination set forth in claim 1 wherein said disengaging means comprises a cam surface on said projection.

3. The combination set forth in claim 2 wherein said stop means comprises a pin which is engaged by said cam surface.

4. The combination set forth in claim 3 wherein said band comprises a plurality of segments, a projection, stop and cam surface being associated with each segment.

5. The combination set forth in claim 1 wherein said elements are of differing sizes.

6. The combination set forth in claim 1 wherein said elements comprise rollers, said rollers having differing diameters.

7. The combination set forth in claim 6 wherein alternate rollers have the same diameter.

8. In a clutch construction comprising inner and outer relatively rotatable members, a flexible friction band interposed between said members, a plurality of separate elements interposed circumferentially between said band and said inner member in abutting engagement with one another and otherwise being independent of each other, and force applying means operable in response to rotation of one of said members to act on said elements and urge them radially outwardly and circumferentially to maintain said elements in abutting engagement not withstanding said radially outward movement thereof, the improvement wherein said elements comprise rollers, alternate rollers having, said force applying means comprising a projection on said one member and stop means on the trailing edge of said band, disengaging means and said stop means having interengaging surfaces which engage upon deceleration or over-running and move the band out of engagement same diameter.

* * * * *